(12) United States Patent
Chou et al.

(10) Patent No.: US 8,437,122 B2
(45) Date of Patent: May 7, 2013

(54) COMPUTER SYSTEM

(75) Inventors: Tsun-Hsien Chou, Taipei Hsien (TW); Chung-Cheng Hsieh, Taipei Hsien (TW); Li-Ping Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 612 days.

(21) Appl. No.: 12/651,155

(22) Filed: Dec. 31, 2009

(65) Prior Publication Data

US 2011/0110024 A1      May 12, 2011

(30) Foreign Application Priority Data

Nov. 9, 2009    (CN) ................ 2009 2 0314399 U

(51) Int. Cl.
*H05K 5/00*        (2006.01)
*H05K 7/00*        (2006.01)

(52) U.S. Cl.
USPC .................. 361/679.02; 361/679.6

(58) Field of Classification Search ............ 361/679.02, 361/679.6
See application file for complete search history.

(56) References Cited

U.S. PATENT DOCUMENTS

| | | | |
|---|---|---|---|
| 7,719,825 B1 * | 5/2010 | Knapp et al. ............. | 361/679.02 |
| 8,045,324 B2 * | 10/2011 | Shen et al. ............... | 361/679.02 |
| 2007/0032998 A1 * | 2/2007 | You et al. ........................ | 703/14 |

* cited by examiner

*Primary Examiner* — Anthony Haughton
(74) *Attorney, Agent, or Firm* — Altis Law Group, Inc.

(57) ABSTRACT

A computer system includes a motherboard, a power supply unit, an interconnect card, and a chassis. The motherboard includes a power connector capable of transmitting power to the motherboard. The power supply unit includes a power supply unit connector. The interconnect card includes a first connector and a second connector. The power supply unit and the motherboard are mounted in the chassis. The first connector is connected with the power supply unit connector, and the second connector connected with the power connector.

18 Claims, 4 Drawing Sheets

COMPUTER SYSTEM

BACKGROUND

1. Technical Field

The present disclosure relates to computer systems, and particularly to a computer system having an interconnect system for providing power to a motherboard of the computer system.

2. Description of Related Art

Recent technical innovations have created faster central processing units (CPUs) for speeding up the data processing rate of a computer system. However, the faster CPUs use much more power. Conventional motherboards cannot supply sufficient power to support these CPUs, so power supplies need to provide a special power cable for the CPU. At present, graphics cards on motherboards also require additional power directly from the power supply. In the future, more and more components on the motherboards will need to obtain power directly from the power supplies via dedicated power cables. This requires a plurality of power cables in a computer system, which is often unruly.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
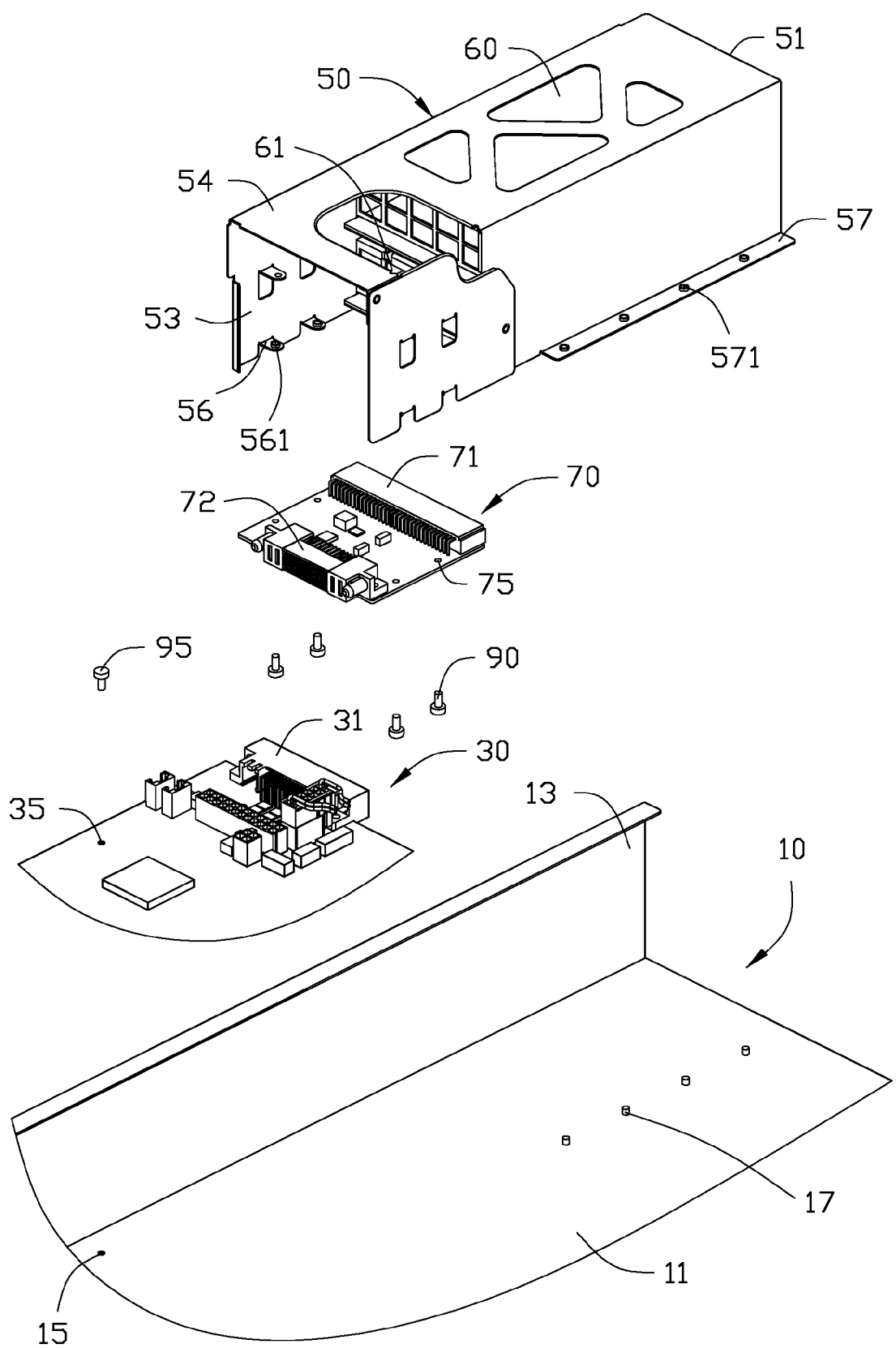
FIG. 1 is an exploded and isometric view of an computer system.

Referring to FIG. 1, a computer system in accordance with an embodiment of the present invention includes a chassis 10, a motherboard 30, a mounting rack 50, a power supply unit 60, and an interconnect card 70.

The chassis 10 include a bottom wall 11, and a side wall 13 extending upwardly from a side of the bottom wall 11. A plurality of mounting posts 17 is formed on the bottom wall 11. The plurality of mounting posts 17 are aligned along a straight line. The bottom wall 11 defines a plurality of first fixing holes 15.

The motherboard 30 defines a plurality of second fixing holes 35 corresponding to the first fixing holes 15 of the chassis 10. A power connector 31 is attached on the motherboard 30 for transmitting power to the motherboard 30.

The mounting rack 50 includes a receiving room 51 at the rear portion. The front portion of the mounting rack 50 forms an "n"-shape frame which includes a pair of parallel side plates 53 and a top plate 54. The pair of side plates 53 respectively forms a plurality of support pieces 56 extending in toward each other. Each support piece 56 defines a first locking hole 561. A bottom edge of the mounting rack 50 forms a flange 57. A plurality of mounting holes 571 is defined in the flange 57 corresponding to the mounting posts 17 of the chassis 10.

The power supply unit 60 includes a power supply unit connector 61. The power supply unit 60 is mounted in the receiving room 51. The power supply unit connector 61 is located in the "n"-shape frame.

Figure 2:
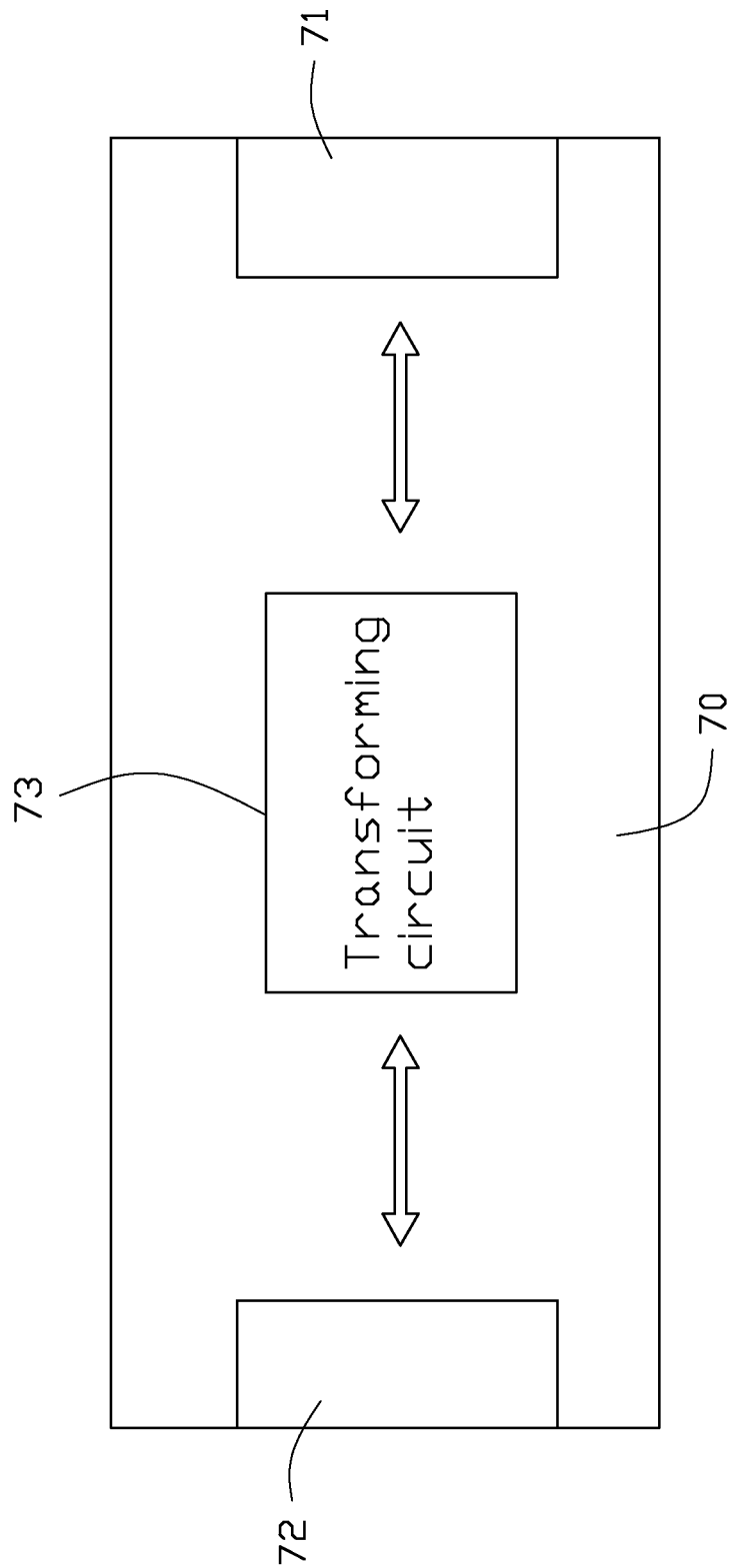
FIG. 2 is block view of a transforming card of the computer system of FIG. 1.

Referring to FIGS. 1 and 2, a first connector 71 is attached on a side of the interconnect card 70, and a second connector 72 is attached on another side of the interconnect card 70. The first connector 71 connects to the power supply unit connector 61 of the power supply unit 60. The second connector 72 connects to the power connector 31 of the motherboard 30. The interconnect card 70 includes a transforming circuit 73. The first connector 71 and the second connector 72 are connected to the transforming circuit 73. The transforming circuit 73 transforms power signals received from the first connector 71, and transmits the transformed power signals to the second connector 72. The interconnect card 70 defines a plurality of second locking holes 75 corresponding to the first locking holes 561 of the mounting rack 50.

Figure 3:
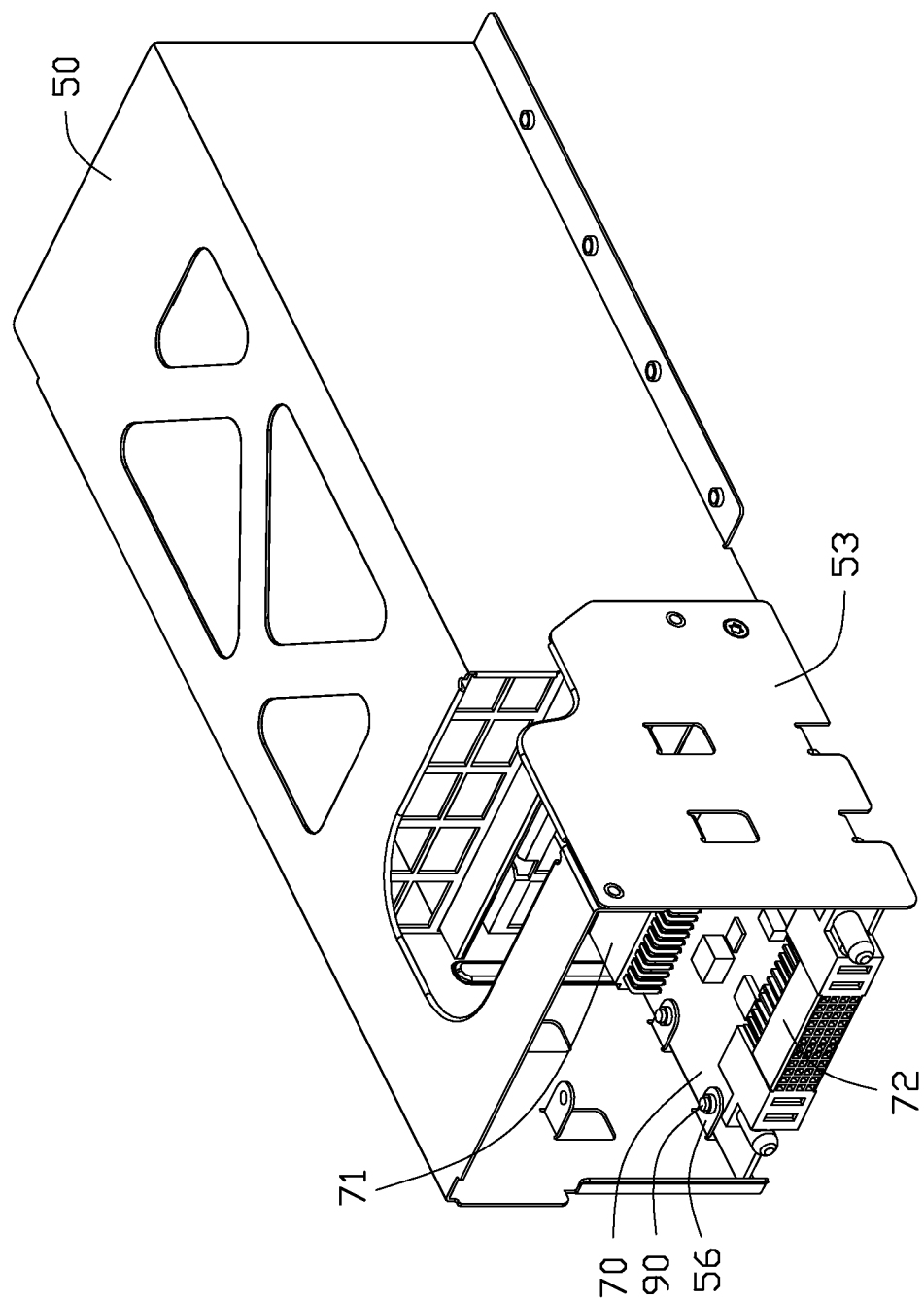
FIG. 3 is part assembly view of the computer system of FIG. 1.
Figure 4:
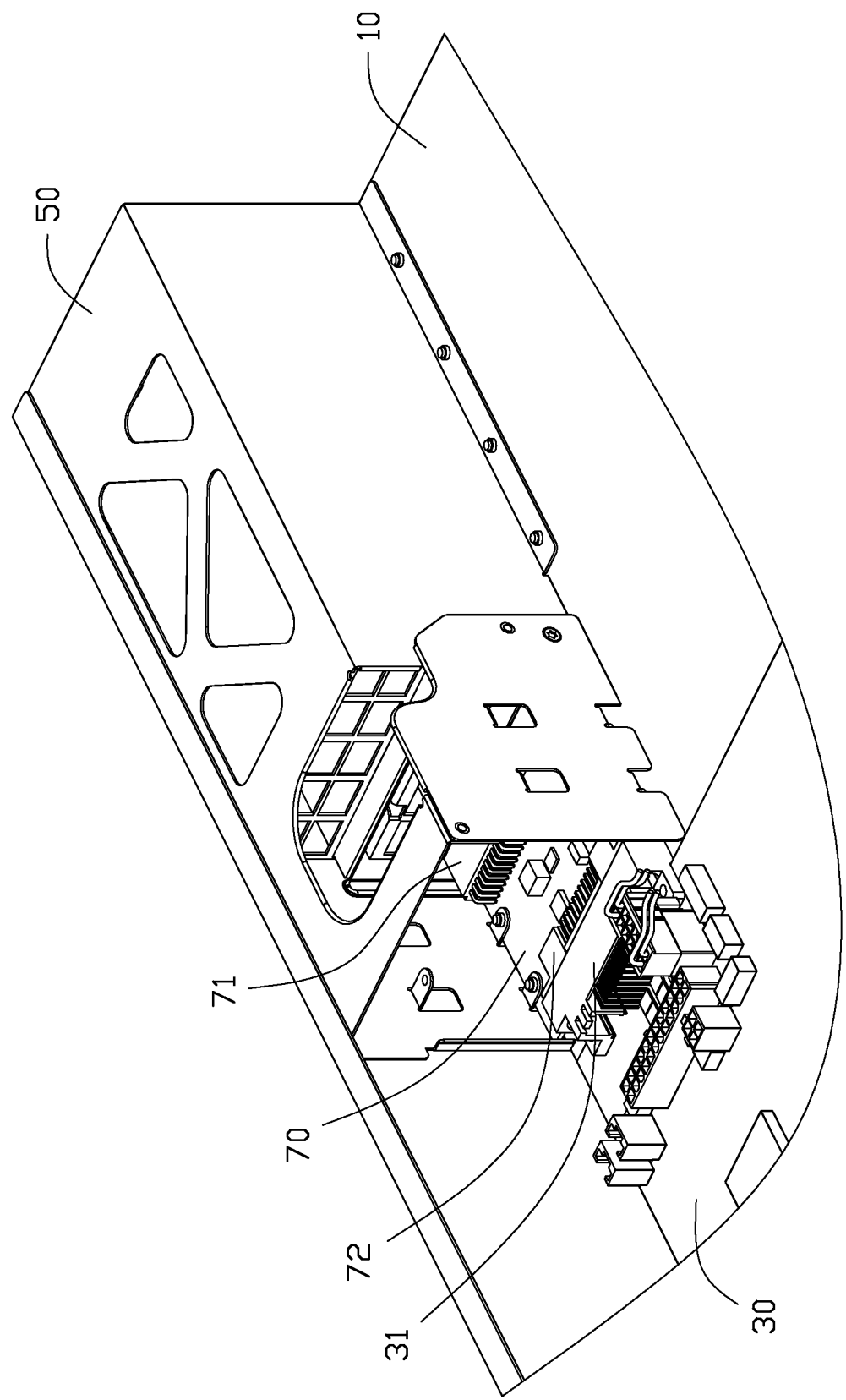
FIG. 4 is an assembly view of the computer system of FIG. 1.

Referring to FIGS. 3 and 4, in assembly of the computer system, the interconnect card 70 is positioned in the "n"-shape frame of the mounting rack 50, and placed on the support pieces 56. The first connector 71 is connected to the power supply unit connector 61 of the power supply unit 60. The second locking holes 75 of the interconnect card 70 are aligned with the first locking holes 561 of the support pieces 56. A plurality of screws 90 is secured in the first and second locking holes 561, 75 to mount the interconnect card 70 on the mounting rack 50.

The mounting rack 50 is then placed on the bottom wall 11 of the chassis 10. The mounting posts 17 of the chassis 10 are inserted in the mounting holes 571 of the mounting rack 50. Therefore, the mounting rack 50 is secured on the bottom wall 11 of the chassis 10. The power connector 31 of the motherboard 30 is then connected with the second connector 72 of the interconnect card 70. The second fixing holes 35 are aligned with the first fixing holes 15. A plurality of screws 95 is secured in the first and second fixing holes 15, 35 to mount the motherboard 30 on the bottom wall 11.

In the above embodiment, the interconnect card 70 directly transfers power from the power supply unit 60 to the motherboard 30. Power cables are not used to avoid unruly cords in the computer system.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:
1. A computer system, comprising:
   a motherboard comprising a power connector capable of transmitting power to the motherboard;
   a power supply unit comprising a power supply unit connector;
   an interconnect card comprises of a first connector and a second connector; and a chassis mounting the power supply unit and the motherboard therein, the first connector is connected to the power supply unit connector, and the second connector is connected with the power connector;

wherein the interconnect card comprises a transforming circuit, the first connector and the second connector are connected to the transforming circuit, and the transforming circuit is capable of transforming power signals received from the first connector and transmitting the transformed power signals to the second connector.

2. The computer system of claim 1, wherein the chassis comprises a bottom wall, a plurality of mounting posts located on the bottom wall; the power supply unit is mounted in a mounting rack, a bottom edge of the mounting rack has a flange in which a plurality of mounting holes is defined; and the mounting posts are inserted in the mounting holes to secure the mounting rack on the bottom wall.

3. The computer system of claim 2, wherein the plurality of mounting posts is aligned in a straight line.

4. The computer system of claim 2, wherein the mounting rack comprises a pair of parallel side plates, the pair of side plates respectively forms a plurality of support pieces extending in toward each other, each support piece defines a first locking hole; the interconnect card defines a plurality of second locking holes; the interconnect card is placed on the support pieces, and the second locking holes are aligned with the first locking holes.

5. The computer system of claim 2, wherein the mounting rack comprises a receiving room, and the power supply unit is mounted in the receiving room.

6. The computer system of claim 1, wherein the chassis comprises a bottom wall, a plurality of first fixing holes is defined in the bottom wall; the motherboard defines a plurality of second fixing holes; the motherboard is placed on the bottom wall, and the second fixing holes are aligned with the first fixing holes.

7. A computer system, comprising:
a chassis comprising a bottom wall, the bottom wall having a plurality of mounting posts thereon;
a mounting rack mounting a power supply unit therein, a bottom edge of the mounting rack has a flange in which a plurality of mounting holes is defined;
an interconnect card comprising a first connector and a second connector; and
a motherboard mounted on the bottom wall of the chassis;
wherein the flange is placed on the bottom wall with the mounting posts inserted in the mounting holes to secure the mounting rack on the bottom wall, the first connector is connected with the power supply unit, and the second connector is connected with the motherboard to provide power to the motherboard.

8. The computer system of claim 7, wherein the power supply unit comprises a power supply unit connector connected with the first connector, and the motherboard comprises a power connector connected with the second connector.

9. The computer system of claim 7, wherein the interconnect card comprises a transforming circuit, the first connector and the second connector are connected to the transforming circuit, and the transforming circuit is capable of transforming power signals received from the first connector and transmitting the transformed power signals to the second connector.

10. The computer system of claim 7, wherein the plurality of mounting posts is aligned in a straight line.

11. The computer system of claim 7, wherein the mounting rack comprises a pair of parallel side plates, the pair of side plates respectively forms a plurality of support pieces extending in toward each other, each support piece defines a first locking hole; the interconnect card defines a plurality of second locking holes; the interconnect card is placed on the support pieces, and the second locking holes are aligned with the first locking holes.

12. The computer system of claim 7, wherein the mounting rack comprises a receiving room, and the power supply unit is mounted in the receiving room.

13. The computer system of claim 7, wherein a plurality of first fixing holes is defined in the bottom wall; the motherboard defines a plurality of second fixing holes; the motherboard is placed on the bottom wall, and the second fixing holes are aligned with the first fixing holes.

14. A computer system, comprising:
a motherboard comprising a power connector capable of transmitting power to the motherboard;
a power supply unit comprising a power supply unit connector; and
an interconnect card comprises of a first connector and a second connector, the first connector directly connected to the power supply unit connector, and the second connector directly connected to the power connector;
wherein the interconnect card comprises a transforming circuit, the first connector and the second connector are connected to the transforming circuit, and the transforming circuit is configured to transform power signals received from the first connector and transmit the transformed power signals to the second connector.

15. The computer system of claim 14, wherein a chassis mounts the power supply unit and the motherboard therein, the chassis comprises a bottom wall, a plurality of mounting posts located on the bottom wall; the power supply unit is mounted in a mounting rack, a bottom edge of the mounting rack has a flange in which a plurality of mounting holes is defined; and the mounting posts are inserted in the mounting holes to secure the mounting rack on the bottom wall.

16. The computer system of claim 15, wherein the plurality of mounting posts is aligned in a straight line.

17. The computer system of claim 15, wherein the mounting rack comprises a pair of parallel side plates, the pair of side plates respectively forms a plurality of support pieces extending in toward each other, each support piece defines a first locking hole; the interconnect card defines a plurality of second locking holes; the interconnect card is placed on the support pieces, and the second locking holes are aligned with the first locking holes.

18. The computer system of claim 15, wherein the chassis comprises a bottom wall, a plurality of first fixing holes is defined in the bottom wall; the motherboard defines a plurality of second fixing holes; the motherboard is placed on the bottom wall, and the second fixing holes are aligned with the first fixing holes.

* * * * *